Patented Dec. 18, 1951

2,579,301

UNITED STATES PATENT OFFICE 2,579,301

CHLORINATED FENCHENE INSECTICIDAL COMPOSITION

George Allen Buntin, Wilmington, Del., assignor to Hercules Powder Company, Wilmington, Del., a corporation of Delaware No Drawing. Application April 8, 1948, Serial No. 19,870

4 Claims. (Cl. 167—30)

This invention relates to an insecticidal composition and more particularly to an insecticidal composition containing a chlorinated fenchene as the toxic ingredient.

Among the more commonly used insecticidal toxicants are the naturally occurring products, pyrethrum, rotenone and nicotine. These natural products have the very great disadvantage of not being uniform in their insecticidal activity. Many synthetic products have been suggested in the past as substitutes for these toxicants; however, they are usually lacking in one respect or another. They do not have a high enough killing power and must be used in concentrations which cause irritation to the user, or, if they are sufficiently toxic, they are also toxic to forms of animal life other than insect pests.

Now in accordance with this invention it has been found that insecticidal compositions containing as a toxic ingredient a chlorinated fenchene, having a chlorine content of from about 56% to about 72%, possess a high degree of insecticidal activity. Because of the high killing power of the chlorinated fenchenes, dilute solutions of these toxicants are effective.

The following examples will illustrate the preparation of these chlorinated fenchenes and the insecticidal activity of compositions containing them.

Example 1

A mixture of fenchenes (alpha, beta, gamma, delta and cyclo) was prepared by the dehydration of fenchyl alcohol. One part of fenchyl alcohol was mixed with 2 parts of sodium hydrogen sulfate and the mixture was stirred and heated to 150°–160° C. The material which distilled at this temperature was condensed over 5% aqueous potassium hydroxide. The organic layer of the distillate was diluted with ether, washed with water until neutral, and the ether solution was then dried over anhydrous sodium sulfate. The ether soluton was distilled at atmospheric pressure through a column and the fraction boiling at 140°–160° C. was collected. This fraction had a refractive index at 20° C. of 1.4650.

One part of the above mixed fenchenes was dissolved in 5 parts of carbon tetrachloride. Chlorine was passed into the agitated solution which was exposed to ultraviolet illumination, the chlorination taking place at a temperature of 70°–75° C. Portions of the reaction mixture were removed at intervals during the chlorination, a total of 5 samples being removed. The carbon tetrachloride was removed from each sample by sparging with nitrogen at 100° C. under a pressure of 25 mm. The products were viscous yellow liquids.

The 5 chlorinated fenchenes were tested for their insecticidal activity against houseflies. The test for insecticidal activity against houseflies was made in the following manner and is referred to as the bell jar method.

Approximately 100 five-day old flies (Musca domestica) were placed in a bell jar and a predetermined quantity of the insecticide to be tested was atomized into the bell jar. The quantity of insecticide used was equal to the amount of the Official Test Insecticide which was necessary to give a 30% to 55% kill and must be within the limits of 0.25 to 0.35 cc. After spraying the insecticide into the chamber the flies were placed in an observation cage containing a wad of cotton wet with a concentrated sugar solution. At the end of 24 hours the number of dead and moribund flies were counted. All tests were carried out at 80°–90° F. and 50–70% relative humidity.

The results of the analysis for chlorine content and of tests made on 1% solutions in deodorized kerosene of the above chlorinated fenchenes are given in the following table. The data are an average of a series of tests made on each solution.

| Chorination Time in Hrs. | Per Cent Chlorine | Per Cent Dead in 24 Hrs. | O. T. I. Difference |
|---|---|---|---|
| 2 | 56.0 | 50 | +1 |
| 2.5 | 61.4 | 76 | +27 |
| 3 | 65.4 | 92 | +43 |
| 4.25 | 69.5 | 83 | +34 |
| 12 | 72.6 | 49 | 0 |

Example 2

An insecticidal dust was prepared by dissolving a chlorinated fenchene containing 65.4% chlorine in kerosene and spraying this solution onto fuller's earth in such proportions as to give a mixture containing 40% of the chlorinated fenchene. This material was then ground and mixed with pyrophyllite to prepare a final dust containing 20% of the chlorinated fenchene. This dust was tested for its insecticidal activity against cotton insects and was found to be very effective.

The chlorinated fenchene which is used as the toxic ingredient of the insecticidal compositions in accordance with this invention should contain an amount of chlorine of from about 56% to about 72%. As may be seen from the foregoing examples, a chlorinated fenchene having a chlorine content within this range has a high insecticidal activity.

The chlorinated fenchene containing from about 56% to about 72% chlorine may be obtained by chlorinating alpha-, beta-, gamma-, delta-, or cyclo-fenchene, or mixtures thereof. The fenchenes are easily prepared by the dehydration of fenchyl and isofenchyl alcohols or by the dehydrochlorination of fenchyl and isofenchyl chlorides. Either of these methods yields a mixture of fenchenes which may be separated if desired. However, for the purposes of this invention the mixture of fenchenes may be chlorinated directly. The chlorination of the fenchenes may be carried out in the presence or absence of a solvent. Lower temperatures are maintained during the chlorination, if a solvent is used. Suitable solvents for the chlorination are chloroform, carbon tetrachloride, pentachloroethane, etc. Chlorination catalysts may be used if desired, ultraviolet light being particularly efficient.

The insecticidal compositions of this invention may be made up of the chlorinated fenchene admixed with any suitable type of diluent. If a liquid spray is desired, the chlorinated fenchene may be dissolved in any convenient solvent, such as deodorized kerosene, or it may be dispersed in water to form an aqueous spray. Insecticidal dusts may be prepared by placing the chlorinated fenchene on a diluent or carrier such as powdered carbon, kieselguhr, bentonite, pyrophyllite, etc.

For many purposes it may be desirable to use the chlorinated fenchene in combination with other insecticidal toxicants. Many toxicants have a very high knockdown in relatively dilute solutions, but much higher concentrations must be used in order to obtain the desired degree of kill. Due to the high degree of killing power which a chlorinated fenchene containing from about 56% to about 72% chlorine possesses, it may be added to such toxicants thereby enabling the use of a much more dilute solution than would otherwise be possible in the finished insecticide. Toxicants with which the chlorinated fenchene may be combined include such compounds as rotenone, pyrethrum, and organic thiocyanates such as alkyl thiocyanates, thiocyano ethers such as β-butoxy-β'-thiocyanoethyl ether, and terpene thiocyanoacylates such as isobornyl thiocyanoacetate, fenchyl thiocyanoacetate, and isobornyl α-thiocyanopropionate.

The high insecticidal activity of a chlorinated fenchene containing from about 56% to about 72% chlorine is illustrated by the foregoing examples. The amount of the chlorinated fenchene to be admixed with the diluent depends upon the use to which the insecticidal composition will be put. For example, for use as a household spray, the chlorinated fenchene is very effective at a concentration of 1% in deodorized kerosene, but when used as an agricultural dust a concentration of 10% to 20% or more may be desirable. The insecticidal compositions of this invention are useful in combatting flies, mosquitoes, roaches, moths, carpet beetles, bed bugs, and many other pests.

This application is a continuation-in-part of my application for United States Letters Patent Serial Number 609,027, filed August 4, 1945, now abandoned.

What I claim and desire to protect by Letters Patent is:

1. An insecticidal composition comprising the product obtained by the chlorination of fenchene with chlorine gas at an elevated temperature to a chlorine content from about 56% to about 72%, said temperature being below that at which the product decomposes and an insecticidal adjuvant as a carrier therefor.

2. An insecticidal composition comprising the product obtained by the chlorination of fenchene with chlorine gas at an elevated temperature to a chlorine content from about 56% to about 72%, said temperature being below that at which the product decomposes and a solid insecticidal adjuvant as a carrier therefor.

3. An insecticidal composition comprising the product obtained by the chlorination of fenchene with chlorine gas at an elevated temperature to a chlorine content from about 56% to about 72%, said temperature being below that at which the product decomposes and a hydrocarbon solvent insecticidal adjuvant as a carrier therefor.

4. An insecticidal composition comprising an aqueous insecticidal dispersion of the product obtained by the chlorination of fenchene with chlorine gas at an elevated temperature to a chlorine content from about 56% to about 72%, said temperature being below that at which the product decomposes.

GEORGE ALLEN BUNTIN.

REFERENCES CITED

The following references are of record in the file of this patent:

UNITED STATES PATENTS

| Number | Name | Date |
|---|---|---|
| 979,704 | Posselt | Dec. 27, 1910 |
| 1,366,106 | Weeks | Jan. 18, 1921 |
| 2,010,841 | Bender | Aug. 13, 1935 |
| 2,337,043 | Hasselstrom et al. | Dec. 21, 1943 |

OTHER REFERENCES

Desalbres et al., Chimie and Industrie, vol. 58, pages 443 to 448 (1947), thru Chem. Abst., vol. 42, page 2719 (1948).

Roark, "A Second Index of Patented Mothproofing Materials," U. S. D. A. Bureau of Chemistry and Soils, Insecticide Division, February 1933, page 84, 167—37.

Frankforter, J. Am. Chem. Soc., vol. 28, pp. 1461–1465 (1906).